(12) United States Patent
Galea et al.

(10) Patent No.: US 6,404,445 B1
(45) Date of Patent: Jun. 11, 2002

(54) METHOD AND SYSTEM FOR MODELING DATA

(75) Inventors: Jeffrey Thomas Galea, Fremont; Noah Christopher Woodman, Santa Clara; James Richard Reid; James Malcolm Sprinkle, both of San Jose, all of CA (US)

(73) Assignee: Cybrant Corporation, Mountain View, CA (US)

( * ) Notice: Subject to any disclaimer, the term of this patent is extended or adjusted under 35 U.S.C. 154(b) by 0 days.

(21) Appl. No.: 09/475,769

(22) Filed: Dec. 30, 1999

(51) Int. Cl.$^7$ .................................................. G06F 3/00
(52) U.S. Cl. ...................... 345/853; 345/762; 345/744; 345/733; 345/764; 707/513; 707/515; 709/201; 709/203
(58) Field of Search ................................ 345/338, 336, 345/339, 333, 335, 329, 356, 764, 708, 705, 762, 744, 733, 853; 707/513, 514; 709/201, 203, 219, 328

(56) References Cited

U.S. PATENT DOCUMENTS

| | | | | |
|---|---|---|---|---|
| 5,500,929 A | * | 3/1996 | Dickinson | 395/160 |
| 5,586,235 A | * | 12/1996 | Kauffman et al. | 345/168 |
| 5,634,095 A | * | 5/1997 | Wang et al. | 395/326 |
| 5,751,967 A | * | 5/1998 | Raab et al. | 395/200.58 |
| 5,802,299 A | * | 9/1998 | Logan et al. | 395/200.48 |
| 5,812,394 A | * | 9/1998 | Lewis et al. | 364/146 |

\* cited by examiner

Primary Examiner—Raymond J. Bayerl
Assistant Examiner—Cuong T. Thai
(74) Attorney, Agent, or Firm—Blakely, Sokoloff, Taylor & Zafman LLP

(57) ABSTRACT

A method and system for processing data are described. In one embodiment, a constraint-based configuration file is generated from a pre-defined data configuration domain at a server. In addition, the constraint-based configuration file is mapped into a plurality of display pages at a client, and a page of the plurality of display pages is updated directly from the constraint-based configuration file.

44 Claims, 23 Drawing Sheets

```xml
,?xml version="1.0" ?>
<Cybrant_IDM>
<Cybrant_Header>
      <Version>7</Version>
</Cybrant_Header>
<Model_Header>
      <Version>1.001</Version>
      <Initial_Price>30</Initial_Price>
      <Max_Display_Domains>6</Max_Display_Domains>
</Model_Header>
<DOMAINS>
      <Enumeration>
            <Variable_Name>Model</Variable_Name>
            <Display_Name>Model</Display_Name>
            <Status_Text>Please select an auto model</Status_Text>
            <UI_Type>S</UI_Type>
            <UI_Group>1</UI_Group>
            <Custom>Custom Tag</Custom>
            <Sticky_Field>true</Sticky_Field>
            <Value>
                  <Value_Name>Defender</Value_Name>
                  <Display_Name>Defender</Display_Name>
            </Value>
            <Value>
                  <Value_Name>Discovery</Value_Name>
                  <Display_Name>Discovery</Display_Name>
            </Value>
            <Value>
                  <Value_Name>RangeRover</Value_Name>
                  <Display_Name>Range Rover</Display_Name>
            </Value>
      </Enumeration>
      <Boolean>
            <Variable_Name>ABS_Brakes</Variable_Name>
            <Display_Name>ABS Brakes</Display_Name>
            <Status_Text>Select an ABS brake option</Status_Text>
            <UI_Type>S</UI_Type>
            <UI_Group>1</UI_Group>
            <Show_Ineligible>false</Show_Ineligible>
            <Value>
                  <Value_Name>0<Value_Name>
                  <Display_Name>No</Display_Name>
            </Value>
            <Value>
                  <Value_Name>1</Value_Name>
                  <Display_Name>Yes</Display_Name>
            </Value>
      </Boolean>
      <Enumeration>
            <Variable_Name>Hidden</Variable_Name>
            <Display_Name>Hidden Field</Display_Name>
            <UI_Type>S</UI_Type>
            <UI_Group>1</UI_Group>
            <Value>
                  <Value_Name>True</Value_Name>
                  <Display_Name>True</Display_Name>
            </Value>
      </Enumeration>
      <Enumeration>
```

FIG. 4b

```xml
<Variable_Name>RoofRack</Variable_Name>
<Display_Name>RoofRack</Display_Name>
<Status_Text>Select a roof rack option</Status_Text>
<UI_Type>S</UI_Type>
<UI_Group>1</UI_Group>
<Show_Ineligible>false</Show_Ineligible>
    <Value>
        <Value_Name>None</Value_Name>
        <Display_Name>None</Display_Name>
    </Value>
    <Value>
        <Value_Name>Standard</Value_Name>
        <Display_Name>Standard</Display_Name>
    </Value>
    <Value>
        <Value_Name>Weekender</Value_Name>
        <Display_Name>Weekender</Display_Name>
    </Value>
</Enumeration>
<Boolean>
    <Variable_Name>Airbag</Variable_Name>
    <Display_Name>Airbag</Display_Name>
    <Status_Text>Select an airbag option</Status_Text>
    <UI_Type>S</UI_Type>
    <UI_Group>1</UI_Group>
    <Show_Ineligible>false</Show_Ineligible>
        <Value>
            <Value_Name>0</Value_Name>
            <Display_Name>No Airbag</Display_Name>
        </Value>
        <Value>
            <Value_Name>1</Value_Name>
            <Display_Name>Airbag</Display_Name>
        </Value>
</Boolean>
<Integer>
    <Variable_Name>Speakers</Variable_Name>
    <Display_Name>Speakers</Display_Name>
    <Status_Text>Select the number of speakers</Status_Text>
    <UI_Type>S</UI_Type>
    <UI_Group>1</UI_Group>
        <Value>
            <Value_Name>2</Value_Name>
            <Display_Name>2</Display_Name>
        </Value>
        <Value>
            <Value_Name>4</Value_Name>
            <Display_Name>4</Display_Name>
        </Value>
</Integer>
<Enumeration>
    <Variable_Name>Color</Variable_Name>
    <Display_Name>Color</Display_Name>
    <Status_Text>Select the color</Status_Text>
    <UI_Type>S</UI_Type>
    <UI_Group>1<UI_Group>
    <Sticky_Field>true<Sticky_Field>
        <Value>
            <Value_Name>aa_yellow</Value_Name>
            <Display_Name>Yellow</Display_Name>
        </Value>
        <Value>
            <Value_Name>alpine</Value_Name>
            <Display_Name>alpine</Display_Name>
```

FIG. 4b (Con't)

```
        </Value>
        <Value>
            <Value_Name>white_gold</Value_Name>
            <Display_Name>White Gold</Display_Name>
        </Value>
        <Value>
            <Value_Name>willow</Value_Name>
            <Display_Name>willow</Display_Name>
        </Value>
    </Enumeration>
</DOMAINS>
<RELATIONS>
    <Expression>
        <Formula>Model (RangeRover) -> ABS_Brakes</Formula>
    </Expression>
    <Expression>
        <Formula>Model (Defender) -> RoofRack (None) </Formula>
    </Expression>
    <Expression>
        <Formula>Model (Discovery) -> RoofRack (None) </Formula>
    </Expression>
    <Expression>
        <Formula>Model (RangeRover) AND Model (Discovery) -> Airbag</Formula>
    </Expression>
    <Expression>
        <Formula>Model (Defender) -> Airbag</Formula>
    </Expression>
    <Expression>
        <Formula>Model (Discovery) -> Speakers (4) </Formula>
    </Expression>
    <Expression>
        <Formula>Model (Defender) -> Speakers (2) OR Speakers (4) </Formula>
    </Expression>
</RELATIONS>
</Cybrant_IDM>
```

FIG. 4b (Con't)

UI Modification

Global UI Elements

Images:

| | | | |
|---|---|---|---|
| Image Dir: | graphics/ | Default Config Image: | graphics/transparent_tiny | Blank Config Image: | true |
| Default Control Image: | graphics/nothing.gif | Assigned Ctrl Image: | graphics/nothing.gif | Transformed Ctrl Image: | graphics/pointer_left.gif |
| Final Ctrl Image: | graphics/pointer_left_final | Help Image: | graphics/help.gif | Header Image: | graphics/transparent_tiny |
| Background Image: | graphics/watermark.gif | Transparent Image: | graphics/transparent_tiny | Menu Open Folder Image: | graphics/openfolder.gif |
| Menu Closed Folder Image: | graphics/closedfolder.gif | Menu Command Image: | graphics/framedoc.gif | Menu Model Image: | graphics/model.gif |
| Menu Domains Image: | graphics/domains.gif | Menu Options Image: | graphics/options.gif | Menu Relations Image: | graphics/relations.gif |
| Menu Info Block Image: | graphics/infoblock.gif | Menu About Image: | graphics/cybweb.gif | | |

Fonts, Colors, and UI Elements:

| Default Font Family: | Arial, Helvetica | Default Background Color | #FFFFFF | Default Text Color | #000000 |
|---|---|---|---|---|---|
| Default Header Font Size: | xx-small | Default True: | | | |

Dynamic Content Frame

General Layout and Options:

| Maximum Domains/Page: | 8 | | | Not Applicable Text: | NA |
|---|---|---|---|---|---|
| | | Use 3P Attributes: | true | Use Group Names: | false |
| Automatically Generate UI: | false | | | Table Cell Spacing: | 16 |
| | | Show Ineligible UI: | true | Ineligible Characters: | <N/A> |
| Sort Ineligible Options: | true | | | Calculate Option Pricing: | true |
| | | Show Option Pricing: | false | Show Page Navigation Links: | true |
| Image Border: | 2 | | | Number Of Columns: | 2 |
| Column Ratio: | 40 | | | Config Number Of Columns: | 2 |

Navigation Frame

| Auto Generate: | |
|---|---|
| true | |

Fonts:

| Font Family: | |
|---|---|
| Arial, Helvetica | |
| Base Font Size: | |
| 1 | |
| Style Font Size: | |
| xx-small | |
| Link Font Size: | |
| xx-small | |

FIG. 8

FIG. 8 (Con't)

FIG. 8 (Con't)

| Field | Value |
|---|---|
| xx-small | |
| Select Lists: | |
| Select List Text Color: #000000 | |
| Select List Text Width: 175 | |
| Select List Font Size: xx-small | |
| Buttons: | |
| Button Text Color: #000000 | |
| Button Width: 80 | |
| Button Font Size: xx-small | |
| Pricing Info: | |
| Price Text Color: #000000 | |
| Price Text Box Width: 175 | |
| Price Font: Arial, Helvetica | |
| Price Font Size: xx-small | |
| Price Label Color: #000000 | |
| Price Label Font: Arial, Helvetica | |
| Price Label Font Size: xx-small | |
| Navigation Header: | |
| Bold Header: true | |

| Field | Value |
|---|---|
| Text Box Width: 175 | Text Box Font Size: xx-small |
| Header: | |
| Header Text Color: #000000 | Bold: true |
| Header Font Family: Arial, Helvetica | Header Font Size: 2 |
| Centered: true | |
| Header Frame: | |
| Font Family: Arial, Helvetica | Base Font Size: 1 |
| Style Font Size: xx-small | Background Color: #FFFFFF |
| Text Color: #000000 | Drop Box Text Color: #000000 |
| Drop Box Width: 175 | Drop Box Font Size: xx-small |
| Button Text Color: #000000 | Button Width: 73 |
| Button Font Size: xx-small | Bold Header: true |
| Header Font Family: Arial, Helvetica | Header Font Size: 2 |
| Header Text Color: #000000 | Centered Header: false |
| Bold Description: | |
| Dynamic Compare Window | |
| Compare Button Index: 0 | Font Family: Arial, Helvetica |
| Base Font Size: 1 | Style Font Size: xx-small |
| Background Color: #FFFFFF | Text Color: #000000 |
| Button Text Color: #000000 | Button Width: 73 |
| Button Font Family: Arial, Helvetica | Bold Header: true |
| Header Font Family: Arial, Helvetica | Header Font Size: 2 |
| Header Text Color: #000000 | Centered Header: true |
| Column Header Font Family: Arial, Helvetica | Column Header Font Size: 2 |
| Column Header Background Color: #FFFFFF | Column Header Text Color: #000000 |
| Row Header Font Family: Arial, Helvetica | Row Header Font Size: 2 |
| Row Header Background Color: | Row Header Text Color: #000000 |

FIG. 8 (Con't)

| | Price | Size | Lens Cover | Auto-Focus | Resolution | Zoom | Picture Quality | CNet Rating | % of Users that Recommend | Quality Rating by Users | Min |
|---|---|---|---|---|---|---|---|---|---|---|---|
| Canon A50 | $500.00 | Small | Yes | Yes | 1M Pixel | None | Decent | 7 | 95 | 3 | 50, 3 400, |
| Olympus D340R | $300.00 | Medium | Yes | Yes | 1M Pixel | Digital | Good | 7 | 100 | 4 | 50, 3 |
| Toshiba PDR-M3 | $500.00 | Small | Yes | Yes | 1M Pixel | Digital | Good | 4 | 50 | 3 | 50, 3 400, |

Feature Map of Camera Model

FIG. 15

METHOD AND SYSTEM FOR MODELING DATA

FIELD OF THE INVENTION

The present invention relates to the retrieval of information over a network and more particularly to a client-side electronic commerce (e-commerce) service system.

BACKGROUND OF THE INVENTION

As networks and computers have been able to deliver information faster, users have begun to expect instantaneous information and information available from anywhere in the world. The vast amount of information available has created an overload of information for the user.

To service user needs, product and service features, options, and rules governing valid selections for e-commerce product and service offerings need to change often in a dynamic web environment. However, building web pages to reflect product selections is a tedious, error-prone, and time-consuming process. In addition, updated information is not easily maintained.

The nature of wide area public networks such as, for example, the Internet, introduces unpredictable network delays in the communication between a browser on a client and a web server. This latency severely hampers the effectiveness of any e-commerce web application as the user is forced to wait for server validation as each selection is made. If a network timeout occurs, user interest may be lost and a potential sale may also be lost.

Complex product/service configurations present a performance challenge for runtime configuration engines (wherein configuration logic is deduced during user interaction), especially over the Internet where each application round-trip (to the application server and back) introduces additional network delay. In addition, sequential runtime logic hampers the user experience by leading product/service selection through pre-determined paths, and valuable user buying pattern information is lost. Users may not be able to see all of the implications of each selection at the time of the selection.

Another challenge for Internet-based configuration engines is that data downloaded from the application server may be cached upon client machines. Proprietary product/service configuration and pricing information must be secure during and after this download process. However, current caching methods do not provide a method for downloading sensitive information without jeopardizing vendor/merchant data security.

Existing solutions to these challenges typically fall into three categories: 1) hand-coded Internet user interfaces (UIs) which act as a facade to a server-side computing engine, 2) server-side generated user interfaces which correlate to server-side computation logic; or 3) client-side generated user interfaces which correlate to client-side, sequential logic.

A non-generated (hand-coded) UI is impractical and expensive to maintain for a dynamically changing e-commerce product/service line, potentially presented to a variety of different users at different geographic locations. Maintenance of the UI in terms of both up-to-date product/service features and up-to-date international location-specific versions may be compromised. In addition, time-to-market is hampered by Website development time and cost. Further, product/service costs may rise, and user satisfaction may decline as inaccurate orders are introduced by this error-prone process. This manual process of constructing the UI, building the configuration, and connecting the two together can not easily guarantee the completeness of complex product/services configurations.

Server-side product/service selection validation techniques may result in a poor user experience due to unpredictable delays caused by Internet latency. Because of this latency, the user may often give up and abandon his or her shopping session, and the potential sale is lost. If the user does continue, any network connection interrupt during the shopping session will typically force the user to restart the product/service selection process from the beginning.

With client-side validation, user selections are limited to only valid choices. Users can pick what they want without having to worry about being rejected by the server at some later time. With server-side validation, the user is allowed to make invalid selections and must wait for a round trip to the server and back for invalidation of the erroneous selection. If the selection is invalid, more user time is wasted trying to undo the selection to get back to a valid state.

Client-side validation may present the user with immediate product knowledge. Immediate product knowledge allows the user to see the implication of each option selection, and to quickly deduce product/service feature differentiators; this allows the user to feel more comfortable with the buying decision. Without this information, users are often required to compare (and remember) multiple pages of product service fact sheets to identify the differentiators. Users may also feel less confidence in their purchase decision, and if they continue, often make inaccurate choices.

Server-side validation necessarily requires more server-side processing, and thus limits the ultimate number of users that can be served by a single server. In addition, runtime configuration logic performs less efficiently, further hampering the user experience and increasing the cost of runtime computing resources. If product/service validation is being deduced logically at runtime, the user is forced to wait for this logic to execute between each selection. If the logic is executed on the server, the additional network delay increases the wait time. If the logic is executed on the client, client computing resources costs rise.

Sequential runtime configuration logic also limits the user interface paradigm, hampering the user experience by leading product/service selection through predetermined paths. Valuable user buying pattern information may be lost as the user is forced to follow these paths. Because only a portion of the product/service selection options are presented at one time, users may not be able to see all of the implications of each selection at the time of the selection.

Sequential logic may limit configuration user interface functionality. Simple features such as single-step "undo" or single-selection override are often limited to a single user interface page, if presented at all. Each page of a multi-paged user interface operates as an independent product/service configuration subset. Sequential logic is also costly to maintain as product/service configuration rules must be hand-coded in a hierarchical program. All updates to the product/service model must preserve an accurate hierarchy.

In addition, client-side generated user interfaces to date have downloaded data in text format, leaving proprietary vendor/merchant product/service configuration and pricing data insecurely cached upon client workstations.

Server-side generated user interfaces require a round-trip to the application web server, as well as an additional web page download, each time the user progresses beyond the product/service selection options presented on one page. This introduces additional network latency and unnecessary user "wait" time. In addition, server-side generated interfaces limit the user by interaction leading the user through predetermined product/service selection paths.

SUMMARY OF THE INVENTION

A method and system for processing data are described. In one embodiment, a constraint-based configuration file is generated from a pre-defined data configuration domain at a server. In addition, the constraint-based configuration file is mapped into a plurality of display pages at a client, and a page of the plurality of display pages is updated directly from the constraint-based configuration file.

BRIEF DESCRIPTION OF THE DRAWINGS

Features and advantages of the prevention invention will be apparent to one skilled in the art in light of the following detailed description in which:

FIG. 4b is an illustrative of an XML visual tag language program listing;

FIG. 8 illustrates an exemplary user input and modification window;

FIG. 15 illustrates an exemplary product comparison window.

DETAILED DESCRIPTION

Figure 1:
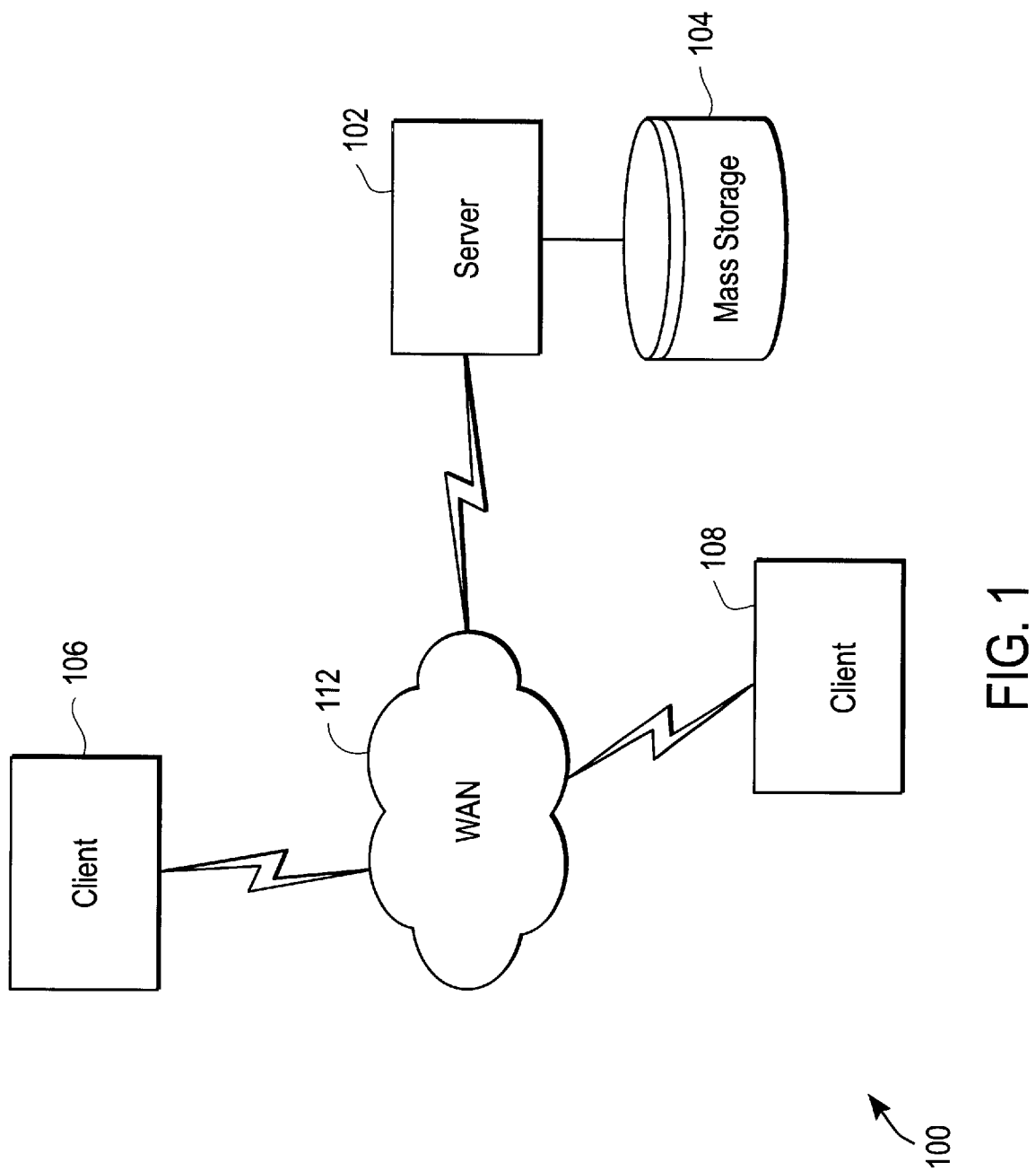
FIG. 1 is an illustration of one embodiment for a distributed client-side e-commerce service system.

A method and system for processing data are described. In one embodiment, the system models data by defining and binding relations between data items and dynamically generating a graphical user interface (GUI) for the data. In one embodiment, a constraint-based configuration file is generated from a pre-defined data configuration domain at a server. In addition, the constraint-based configuration file is mapped into a plurality of display pages at a client, and a page of the plurality of display pages is updated directly from the constraint-based configuration file.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is an illustration of one embodiment for a distributed client-side e-commerce service system 100. Referring to FIG. 1, server 102 is coupled to mass storage device 104. Server 102 and mass storage device 104 are coupled via wide area network (WAN) 112 to a variety of clients 106 and 108. Wide area network 112 may be coupled to any of a variety of clients 106 and 108. In one embodiment, mass storage device 104 contains a product component and graphical user interface (GUI) database and an interactive decision map database. In an alternate embodiment, each of the databases may be contained in a separate mass storage devices 104.

In one embodiment, the databases contain compiled product or server components (domains). Each domain contains descriptive information which bind the domain elements to their respective GUI representations. Prerequisite tags may indicate the GUI element type such as, for example, single select list box, multi-select list box, radio buttons, click boxes, and input text field, or images that present the selections options for that domain. Optional domain tags determine the run time behavior of each GUI element such as, for example, whether. or not to display invalidated options (and subsequently allow single selections overrides), whether or not user interface pages are presented as sequential pages or as grouped elements, whether or not pages/groups for each domain are to be displayed and where they are to be displayed, whether or not the domain is hidden (not included in the user interface), whether or not the domain is displayed as a read only form element (whereby the domain selection may only be made through configuration logic), whether or not to include local or specific domain and domain options representations, whether or not and which corresponding images are to be displayed with each option selection, whether or not and in which form an image element is to be updated with the corresponding image, whether or not and for which corresponding help pages are available for each domain and option selection, whether or not and in what form a status text to offer when navigation to each domain is included, and whether or not the domain is required for final product selection (order inclusion).

A user accesses a server through client 106, 108 via wide area network 112 in order to access items for sale (domains) in the product and GUI database. Each product or service configuration domain, together with the user interface tags, is compiled into a secure, binary compressed file format. After a user accesses the domain through client 106, 108, the compiled configuration model is downloaded to the browser of client 106, 108. The user interface is dynamically generated based upon the compiled domain tags.

A runtime page map builds multi-paged and/or grouped user interfaces with individual domain indexes corresponding to their appropriate configuration counterparts. Users are free to make product options selections in any order of preference on any pages as the validation determination is not hierarchical. All valid information and possible configurations are downloaded at one time from server 102 to client 106. The user may browse through the product information, make selections, and view product detailed information without again accessing server 102. Once the user makes a selection to buy a particular item, the user submits the request and client 106, sends the purchased data to server 102 for further completion of the order. In one embodiment, user selections are validated on client 106, through a configuration indexing scheme (as opposed to run time configuration logic) into the product server configuration truth tables. User interface behavior in making selections is obtained through equivalent indexing and through a product service configuration model as the user navigates through the downloaded domain. Visual representation of the form elements and corresponding configuration domains that have been accessed by each selections as well as which element options are no longer valid, guide the user through an educated buying session. In one embodiment, invalidated options are still displayed, with a not available visual indicator (such that a user may subsequently override an earlier selection.)

The distributed client-side e-commerce service system 100 allows for the automatic generation of a user interface for a particular product and/or service model "on-the-fly" such that a web user is always presented with the latest product or service selection choices. In addition, system 100 avoids the inherent network latency problems by generating all of the user interfaces and performing all user-selection validation directly within client 106, 108. In addition, the system 100 presents the product or service configuration options to the user in their entirety. System 100 adapts to international settings or different representations of the same product that may be required. System 100 separates a given model from the specifics of the user interface which allows many different user interfaces to reflect the same physical product or service model.

Figure 2:
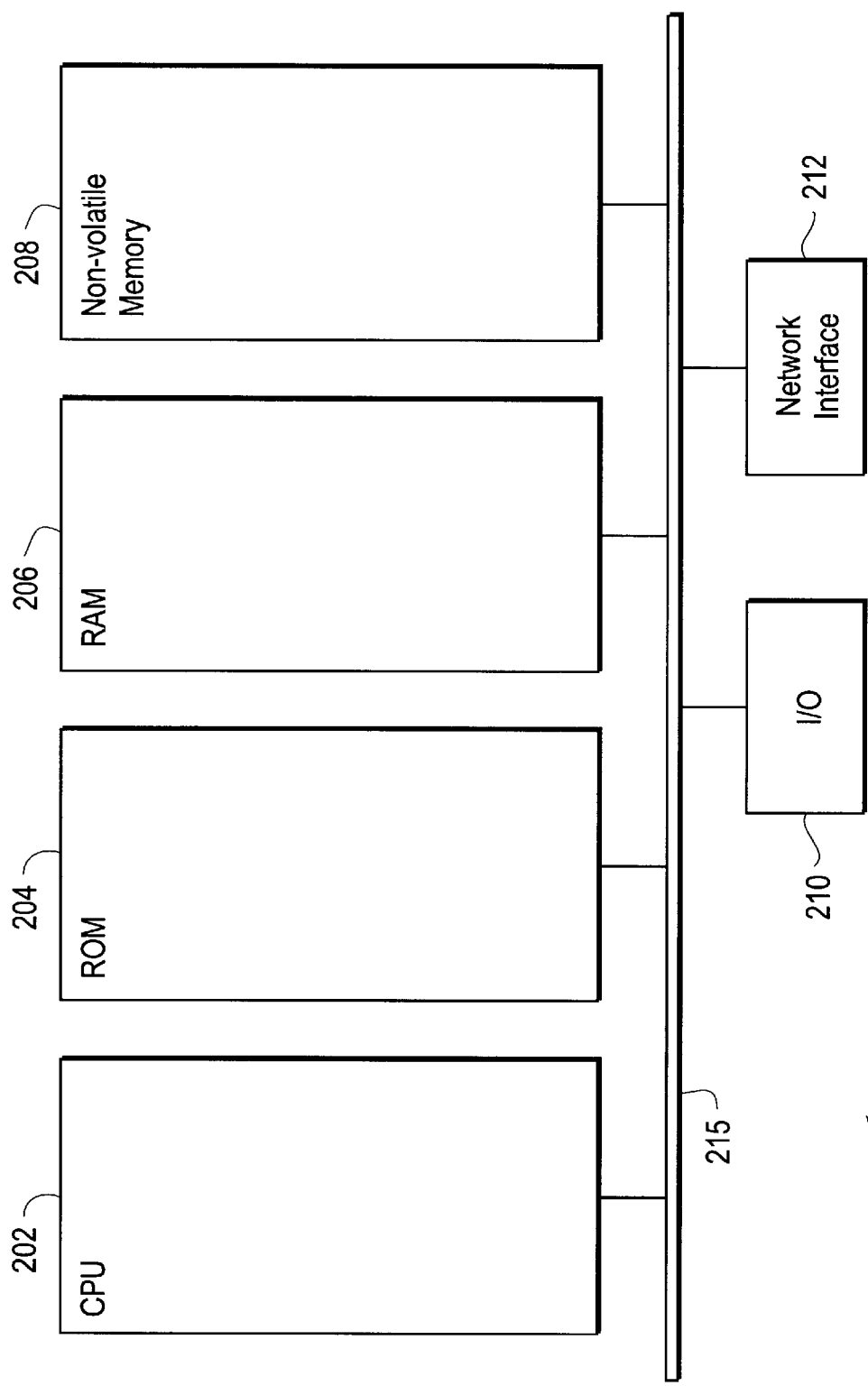
FIG. 2 is a block diagram of one embodiment of an architecture of a computer system.

FIG. 2 is a block diagram of one embodiment for an architecture for a computer system 200. Referring to FIG. 2, CPU 202 is coupled via bus 215 to a variety of memory structures and input/output 210. The memory structures may include, for example, read only memory (ROM) 204, random access memory (RAM) 206, and/or non-volatile memory 208. In one embodiment, CPU 202 is also coupled via bus 215 to network interface 212. Network interface 212 is used to communicate between computer system 200 and server 102 and a variety of other computer terminals 108. Network interface 212 is coupled to the wide area network 112 by any of a variety of means such as, for example, a telephone connection via modem, a DSL line, or the like. The architecture shown in FIG. 2 may be utilized for either client 106, 108, server 102, or both.

In one embodiment, user interface tags as well as configuration domains and relations are modeled into a product and GUI database. The user interface definition tags are merged with the configuration domain and relation definitions which are then compiled into an interactive decision map. The merge and compilation process binds the user interface and configuration data into the compiled database. When the user requests information through the server 102, the compiled model is downloaded in its entirety in a compressed data file format through WAN 112 to client 106. A Java runtime applet on client 106 downloads the model and builds a multi-page graphical user interface (GUI) map by looping through the downloaded information and collecting array elements contained within the downloaded file. In one embodiment, the Java applet reads the compressed file directly without decompressing the information.

After the information is downloaded to the client 106 and the page map has been built, any page in the product service selection user interface may be generated by looping through the downloaded information and passing the information to a runtime application programming interface (API) which visually draws the display elements on the browser's display. This is accomplished by referencing the user interface and configuration runtime array properties within the downloaded file. As the user makes products and service selections, the values corresponding to the GUI elements for the selection are used to draw the appropriate information from the file and place it within the GUI. The list of available options for the user are modified for visible domains that may have changed as a result of the last user selection such that a user is prevented from making contradictory configuration choices during subsequent product and service selection. The object representing the domain of the particular selection is updated in place by reducing and/or increasing the number of elements present or changing the properties of configurable elements. Once the compressed file is downloaded to client 106, all interaction between the user and the elements are maintained within client 106. The client 106 does not interact with server 102 unless the user selects a new service or submits a purchase button.

Figure 3:
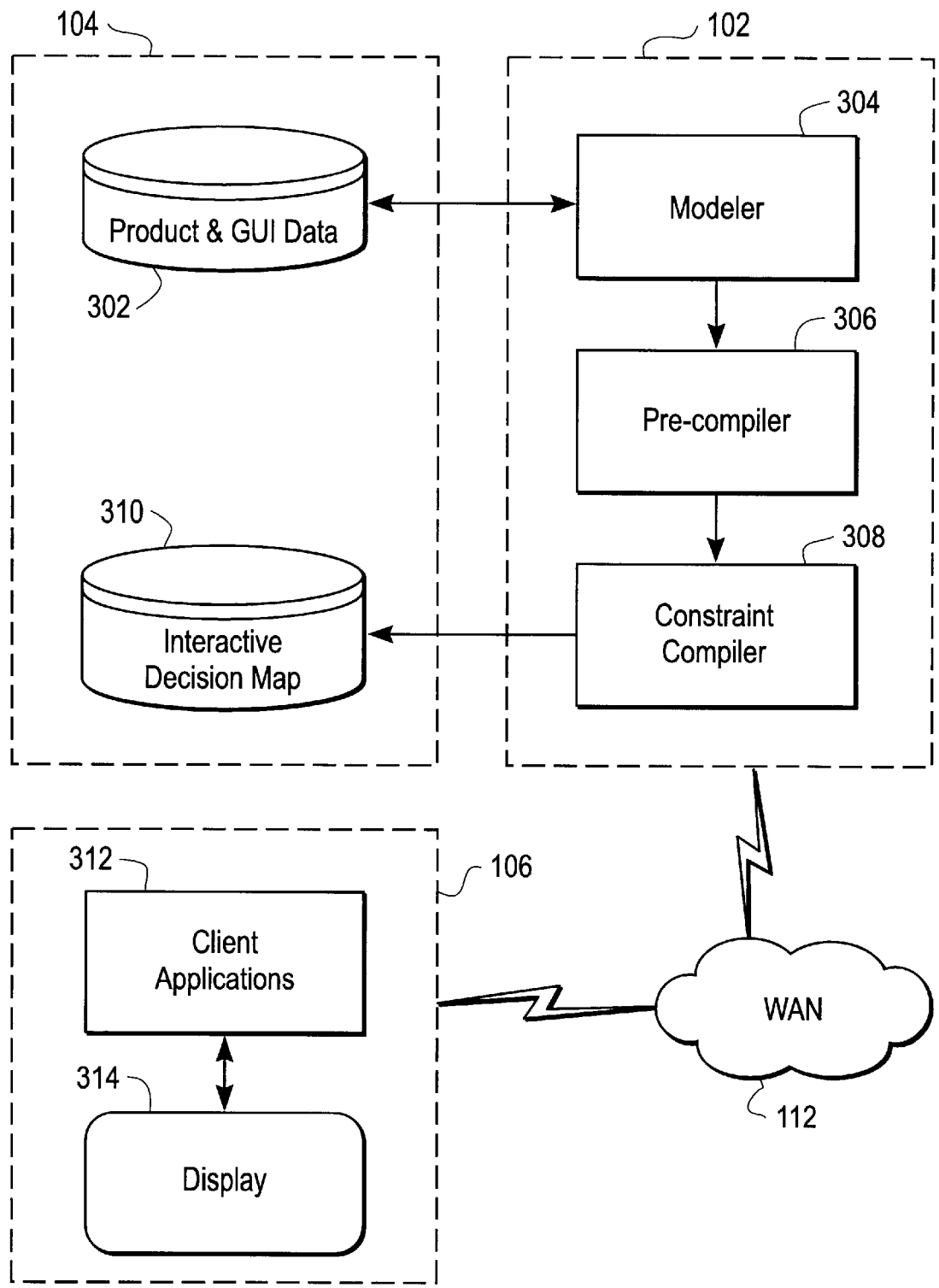
FIG. 3 is a block diagram of one embodiment for a distributed client-based e-commerce service system.

FIG. 3 is a block diagram of one embodiment for a distributed client based e-commerce service system 100. Referring to FIG. 3, user interface tags as well as configuration domain and relations are modeled into product and GUI database 302 by modeler 304. Modeler 304 is an XML editor which takes the user interface definition tags, merges the configuration domain and relation definitions, and spawns the execution of a compiler. Modeler 304 passes control to precompiler 306. Precompiler 306 formats product and GUI data 302 into a structure that is used by constraint compiler 308. In one embodiment, constraint compiler 308 compiles product and GUI data 302 into an interactive decision map 310. In one embodiment, the decision map 310 may be in the form of an array of truth tables. Each domain accessible by a user is compiled into separate interactive decision maps. For example, an online bookstore domain is compiled into a unique interactive decision map 310 and an online drugstore domain is compiled into a separate interactive decision map 310.

A user accesses server 102 via WAN 112 from client 106. When the user makes a selection as to a domain (for example, an online camera store), the compiled interactive decision map 310 for the requested domain is downloaded to client 106. In addition, a client applet is downloaded to client 106. The client applet downloads the interactive decision map 310 for the particular domain and builds a multi-page graphical user interface (GUI) map by looping through the interactive decision map 310 and collecting array elements for each configuration domain. The array elements represent the pages on which each domain will be displayed. In addition, the downloaded interactive decision map 310 contains information as to the visual representation that the domain will take and the user interface groupings or tabular pages included within the domain. The resident application programming interface (API) draws the mapped information on the browser's display. Client application 312 contains the client applet and API for display of the domain information on display 314 and browser application for interacting with server 102.

After interactive decision map 310 is downloaded and the page maps are built, any page in the product or service selection user interface may be generated by looping through the downloaded information. In one embodiment, the downloaded information is accessed by the use of Javascript or Java. In alternate embodiments, any applicable runtime applet may be used. The applet draws the HTML elements to the browser by referencing the user interface and configuration properties for the particular domain.

As the user makes selections, the values corresponding to the interface elements are used to make the appropriate selections within the downloaded interactive decision map file 310. An index may be used to refer to the particular elements within the downloaded file to retrieve the particular elements and properties for each domain represented in the current user interface page. The list of available options are modified for visible domains that may have changed as a result of the last user selection such that a user is prevented from making contradictory configuration choices during subsequent product or service selections. The particular object representing the domain are updated and placed by reducing and/or increasing the number of options present or changing the properties to visually show a configurable "not applicable" visual text string. In addition, the objects may enable or disable text fields or buttons. Array elements are checked to determine if the images on a page must be updated as the result of the last user selection. In addition, visual indicators or images are updated based on the user selections. The updated information is redisplayed on display 314.

Figure 4A:
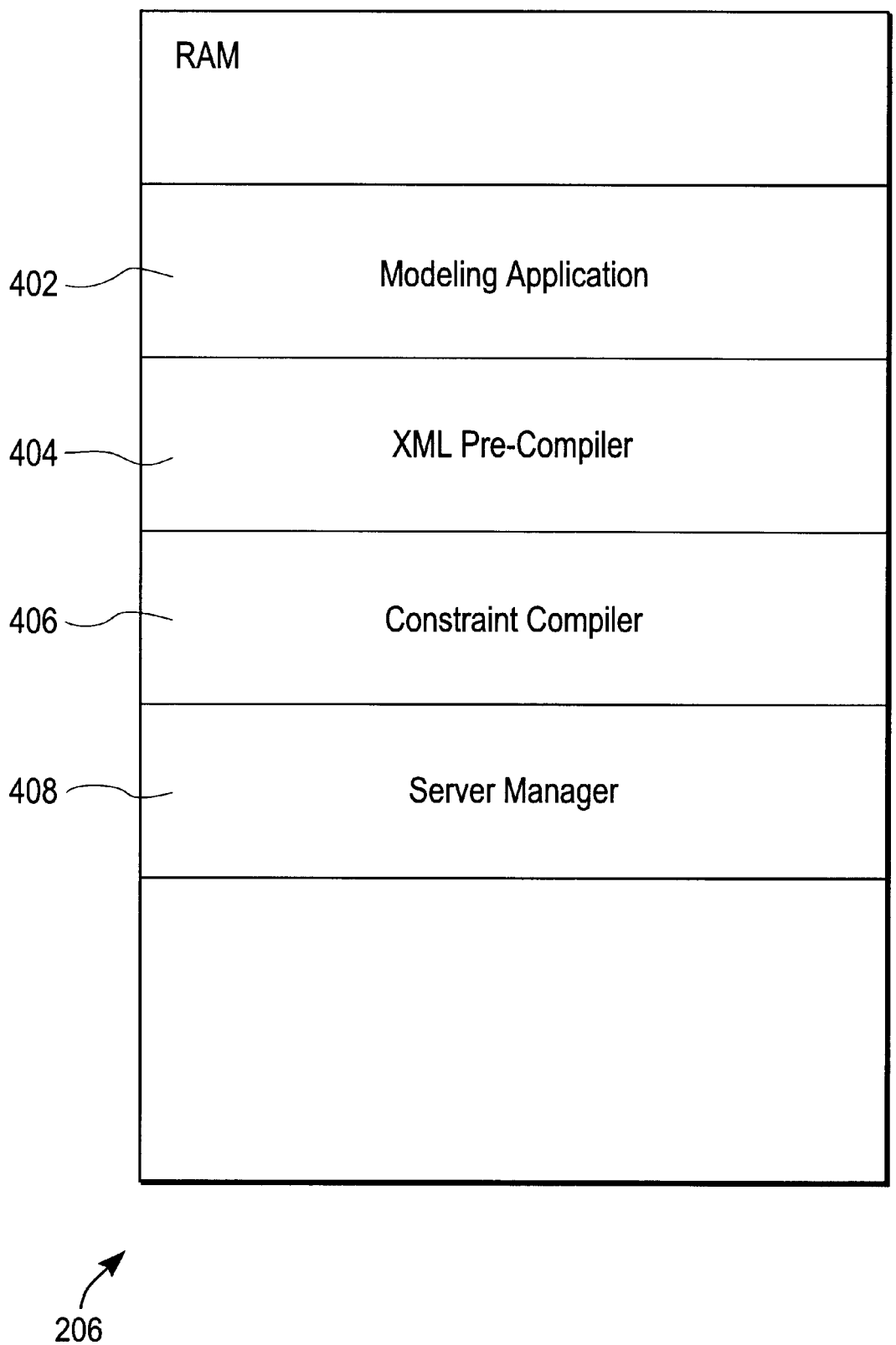
FIG. 4a is a block diagram of one embodiment for random access memory of a server of FIG. 3.

FIG. 4a is a block diagram of one embodiment for random access memory 206 of server 102. RAM 206 includes modeling application 402, XML precompiler 404, constraint compiler 406, and server manager 408. Modeling application 402 is used to access and insert tags and relations into the configuration domain. Modeling application 402 is an XML editor which uses the user interface definition tags and merges the tags with configuration domain and relation definitions to create input to the compiler. In one embodiment, modeling application 402 combines needs analysis, features, and configurable options to bind the user interface and configuration data into a compiled interactive decision map 310. In one embodiment, modeling application 402 may combine features, needs analysis, third party reviews, and derived features to create the relationships utilized by constraint compiler 308 and client applications 312 to display and manipulate information on display 314.

XML precompiler 404 formats the data created by modeling application 402 into a form suitable for use by constraint compiler 406. In one embodiment, modeling application 402 creates an XML visual tag language file containing the information input into the modeling application 402. XML precompiler 404 reformats the XML tag language input into a format suitable for the constraint compiler input 406.

Constraint compiler 406 compiles the output from XML precompiler 404 into a number of binary truth tables. In one embodiment, an Array Technology configuration engine (as described in PCT No WO 99/48031 which is incorporated herein by reference) must be used to compile the formatted XML precompiler 404 output into an array of truth tables. Information not utilized by the constraint compiler but necessary for display of information is passed as a comment tag at the end of the element of the truth table. Constraint compiler 406 produces an interactive decision map 310 for each domain incorporated into the system 100. The output of the constraint compiler 406 includes an array or all possible options for the domain followed by local specific domain option user interface creation tags. The array of possible options for the domain includes, in one embodiment, only combinations that are legally logically possible for the options of the domain. Thus, the array does not contain configurations that are illogical or impossible to achieve.

Local specific domain option user interface creation tags may include, for example, display names, help links, display image source, image destination, and other suitable tags. In addition, interactive decision map 310 for a specific number of domains includes local specific domain interface creation tags for the entire set of domains included in the interactive decision map 310. The interface creation and behavior tags are compiled directly into the interactive decision map 310 such that every domain index that determines the configuration selection indications also determines the user interface characteristics for the domain.

Server manager 408 is used to transfer the compiled interactive decision map 310 together with the client applet to client 106 in order for the client applications 312 to access and download interactive decision map 310.

FIG. 4b is an illustrative of an XML visual tag language program listing. In one embodiment, modeling application 402 creates the XML visual tag language program listing. The XML visual tag language listing example of FIG. 4b contains the information input into the modeling application 402 for an automobile domain configuration.

Figure 5A:
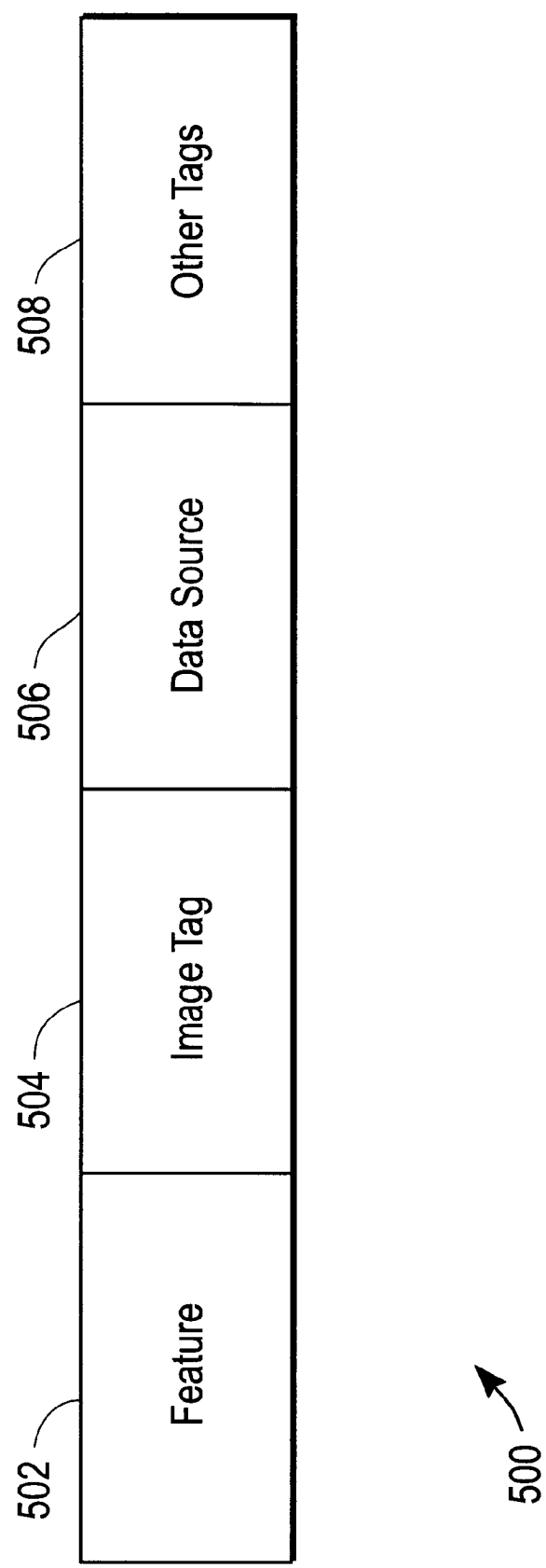
FIG. 5a is a block diagram of one embodiment for a configuration model data item.

FIG. 5a is a block diagram of one embodiment for a configuration model data item 500. Referring to FIG. 5a, configuration model data item 500 represents one embodiment of elements of the interactive decision map 310. For a given element or feature 502, data item 500 may also contain an image tag 504, data source 506, and other tags 508. The feature 502 is used to build the user interface map on client 106 through the runtime array and collecting the array elements. The image tag 504, data source 506, and other tags 508 are used to map and draw the user interface on display 314.

Figure 5B:
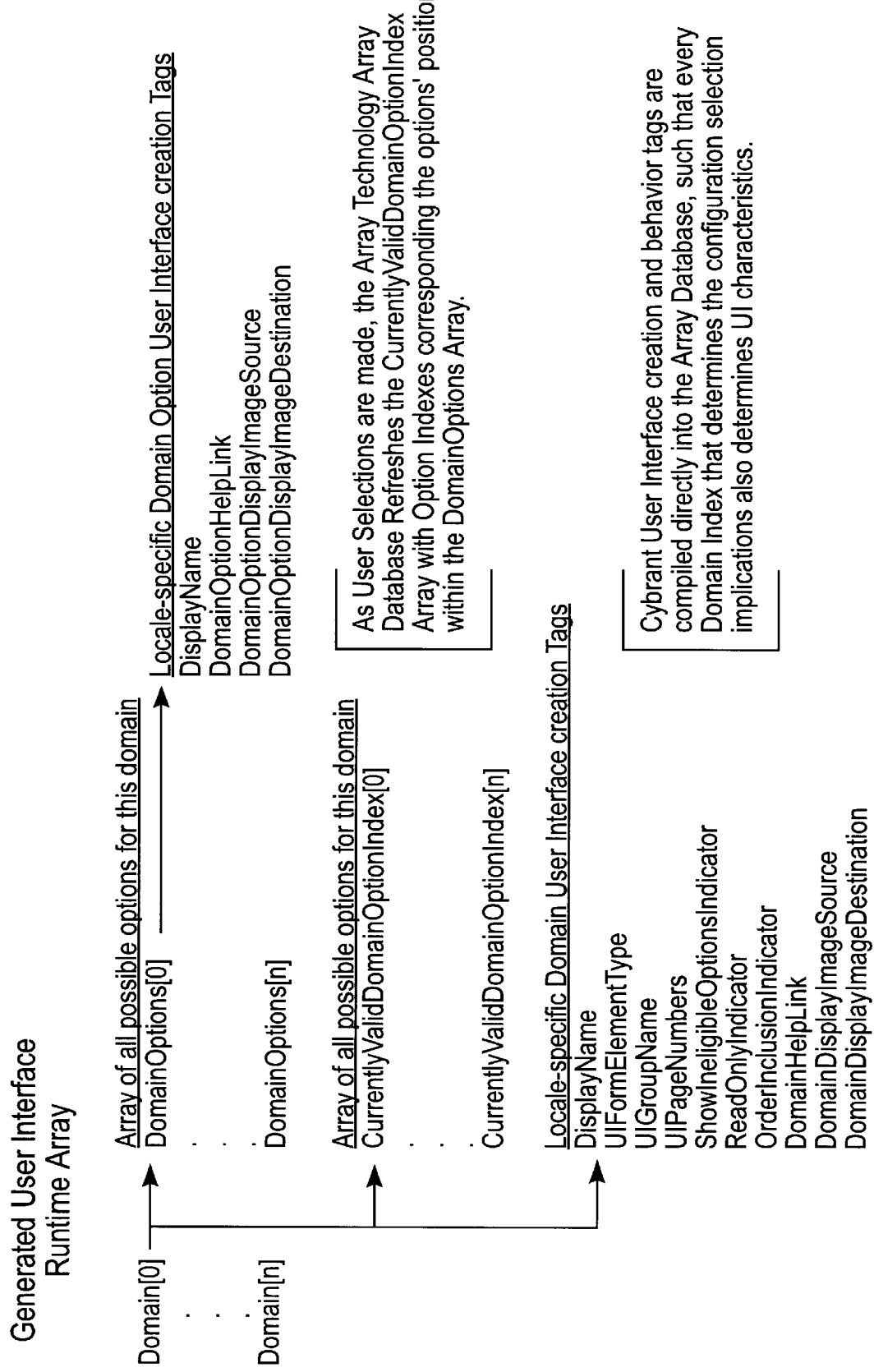
FIG. 5b is an illustration of one embodiment for a compiled array database.

FIG. 5b is an illustration of one embodiment for a compiled array database. In one embodiment, user interface tags (see FIG. 4b), together with the configuration domains and relations, are modeled into the Array Technology array database using modeler 304. Modeler 304 is an XML editor which takes the user interface definition tags, merges the configuration domain and relation definitions, and spawns the execution of the Array Technology compiler. Modeler 304 passes control to precompiler 306 which formats the data into a structure that is used by the compiler. The merge and compilation binds the user interface and configuration data into the compiled array database.

Figure 5C:
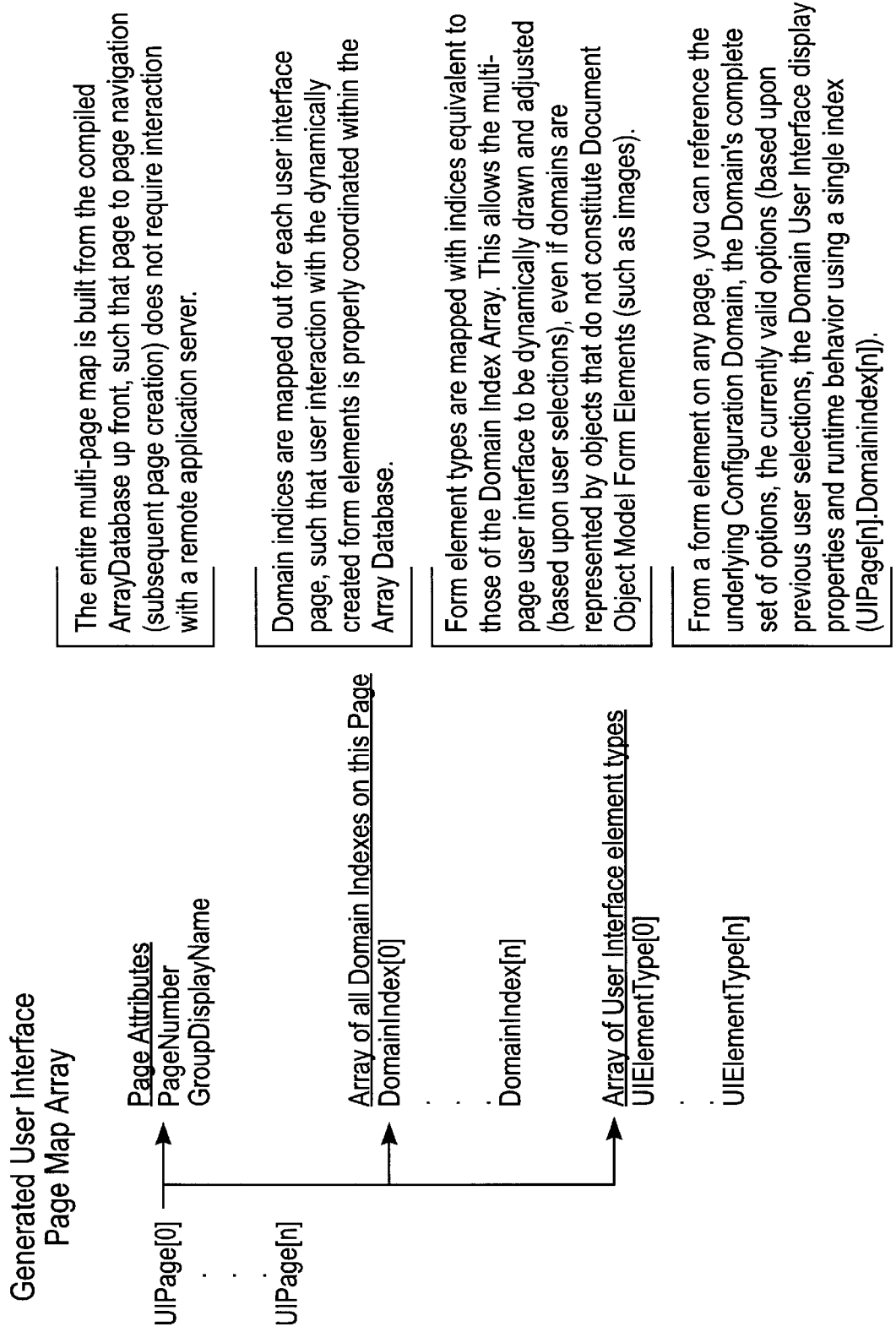
FIG. 5c illustrates one embodiment for a page map.

FIG. 5c illustrates one embodiment for a page map. Once a user accesses a particular configuration domain, the compiled model is downloaded in its entirety in a compressed format. A client applet downloads the model and builds a multi-page user interface map by looping through the runtime array and collecting array elements such as, for example, UIPageNumbers, UIFormElementType, and the UIGroupName for each configuration domain. The UIPageNumbers represent the pages on which each domain will be displayed, UIFormElementType indicates the type of visual representation the domain will take, and UIGroupNames indicates what UI grouping (tabular pages) are included in this domain.

After the array database has been downloaded and the page map has been built, any page in the product/service selection user interface may be generated by looping through the index of the array using, for example, JavaScript or Jscript. In addition, the HTML elements are visually drawn to the browser's Document Object Model (DOM). This is done by referencing the user interface and configuration runtime array properties for the domain using domain-index as the index into the domain array.

As a user makes product/service selections, the UI page array domain index value corresponding to the user interface form element is used to make the appropriate array database selection. An index may be generated by accessing the runtime domain array to retrieve the currently-valid-domain-option-index array and to retrieve the show-ineligible-options property for each domain represented on the current user interface page. The list of available options are modified for visible domains that may have changed as a result of the last user selection such that a user is prevented form making contradictory or invalid configuration choices during subsequent product/service selections. The DOM representing the domain is updated in place by reducing and/or increasing the number of options present, changing the options text properties to visually show a configurable "Not Applicable" text string, enabling/disabling text fields, enabling/disabling buttons, and so on.

The domain-option array of the current domain is used to retrieve the domain-option-display-image source and domain-option-display-image destination properties to see if there are images on the current page that must be updated as a result of the last user selection. Finally, visual indicators (images) are updated next to domains that have been reduced by the last selection, or selected as a result of the last selection.

Figure 6:
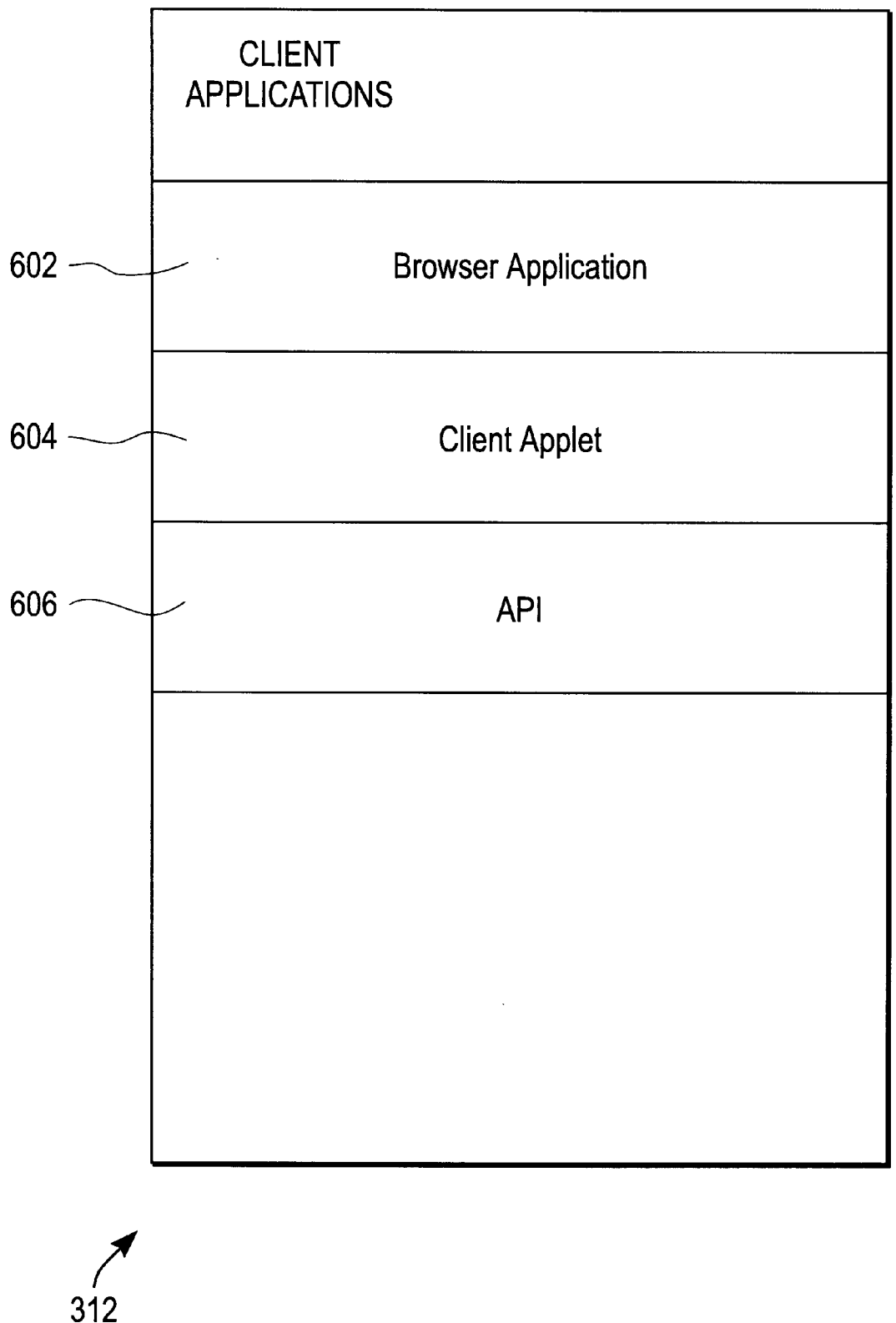
FIG. 6 is a block diagram of one embodiment for client applications of FIG. 3.

FIG. 6 is a block diagram of one embodiment for client applications 312. Client applications 312 include browser application 602, client applet 604, and API 606. Browser application 602 is used to access and interact with the server 102. Browser application 602 is used to access interactive decision map 310 and download the compiled data file from server 102 to client 106. Client applet 604 is used to read the downloaded compressed file and process the image map into an interactive decision map file. API 606 is a Java class that is responsible for reading the interactive decision map file and drawing the mapped pages on the browser's display. In one embodiment, client applet 604 reads the compressed file directly without uncompressing the file. Client applet 604 enumerates the variables within the interactive decision map 310 file by creating an index of visual information that match the index of the constraint language. Client applet 604 is also responsible for updating display information on display 314 as the user manipulates through the downloaded file by traversing and re-indexing the map file.

Figure 7:
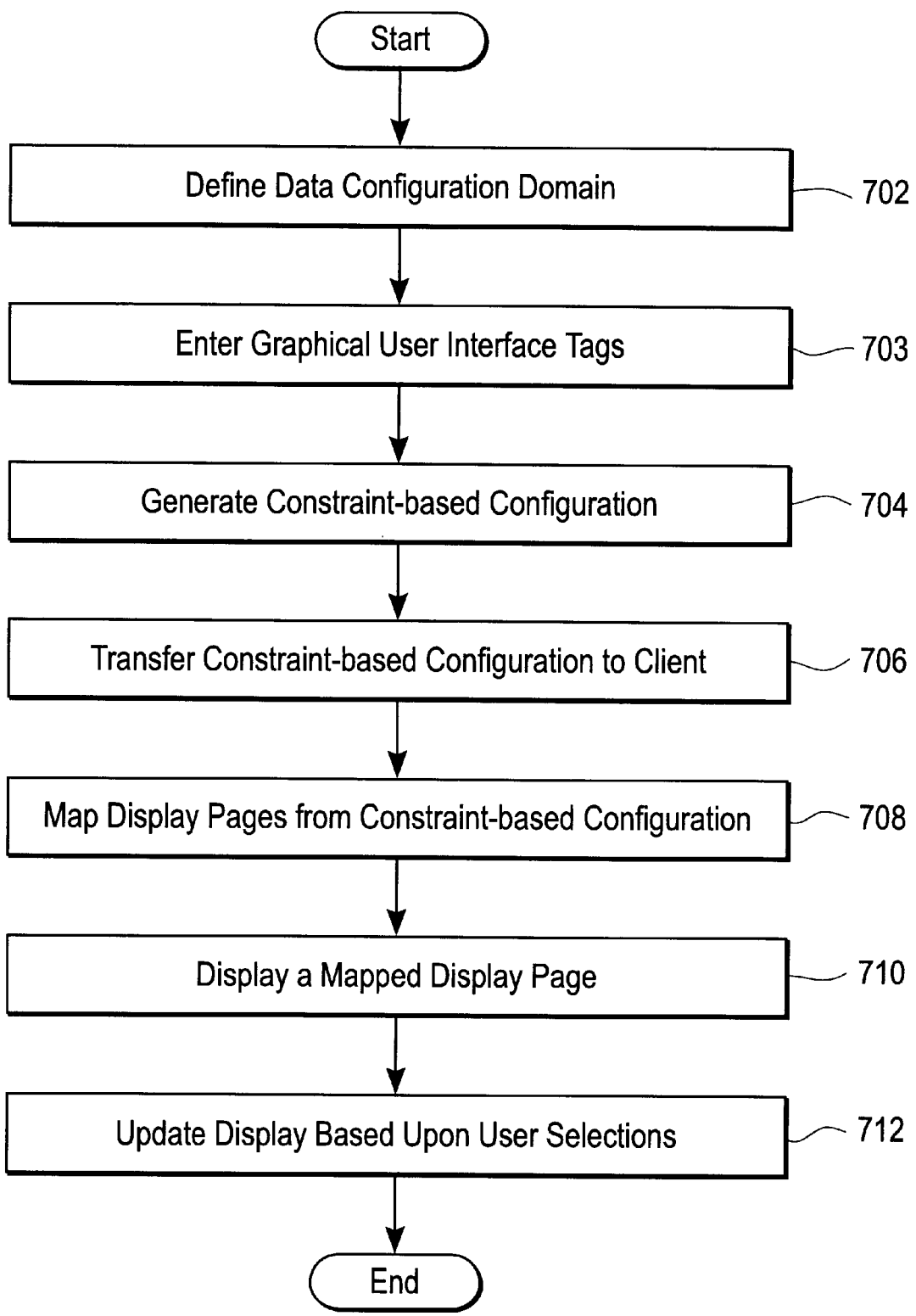
FIG. 7 is a flow diagram of one embodiment for defining, binding, and dynamically generating a client-based graphical user interface for a client-based e-commerce system.

FIG. 7 is a flow diagram of one embodiment for modeling data for a client-side e-commerce system 100. Initially at processing block 702, the data configuration domain for a particular e-commerce site is defined. In one embodiment, system 100 models data by defining and binding relations between data items. At processing block 703, graphical user interface (GUI) tags are entered and dynamically generated. The GUI tags are used to define relations between the data and the graphical representation of the data. The graphical user interface (GUI) tags, together with configuration domain relations generated at processing block 702, are modeled into an extended markup language (XML) configuration file. The XML configuration file is saved in product in GUI data 302.

At processing block 704, the tagged information is compiled into a set of truth tables. The XML tagged language is first precompiled to create a format of the file in a format that is understood by the compiler 406. The compilation binds the user interface and configuration data into a compiled interactive decision map 310. In one embodiment, interactive decision map 310 is an array of truth tables together with display tags appended as comments to the table.

At processing block 706, the compiled interactive decision map 310 is transferred from server 102 to client 106,

108. Browser application 602 requests information from server 102. Server manager 408 downloads the appropriate configuration interactive decision map 310 and client applet 604. The compressed file is received by client 106 which initially loads a null file. When a user selects a model from the combination box, the client applet 604 submits a request for transfer from server 102. The server 102 retrieves the information from the interactive decision map database 310 and downloads the compressed file to the client. The client applet 604 is loaded and the Java virtual machine (JVM) initializes the display. The interactive decision map 310 is read and parameters within the file is used to derive the model file name, which is then passed to API 606. API 606 then downloads the model from the server 102.

At processing block 708, API 606 builds the display pages from the constraint based configuration. API 606 dynamically builds the HTML for both the header and detail information frames of the applicable domain.

At processing block 710, the mapped display pages are displayed on display 314. Once the user selects the configuration option, the appropriate information is read from the compressed file and displayed on display screen 314.

At processing block 712, a user makes selections of entries presented on the GUI. As the user makes selections based on the displayed information, client applet 604 reconfigures the information displayed using only the downloaded file information to present the user with a visual feedback to enable the user to discern between valid and invalid selection options. During the user's traverse of the information, client applet 604 updates the information without client 106 accessing server 102 for further information. All the possible combinations of information for the domain have been downloaded within the constraint based configuration. Once the user has finalized a decision (for example, made a selection of a book from a variety of selections), the user may send the information to the server 102 for purchase. In one embodiment, the user sends the information to the server 102 by clicking on a submit button. The selected information from client 106 is sent to server 102 which may then process the selected information. In an alternate embodiment, the information is transferred to a secondary server for purchase. In one embodiment, a confirmation message may be sent back from server 102 to client 106. Thus, a user may manipulate through a given domain of information without further access to server 102 until the submit button has been pressed.

Figure 8:
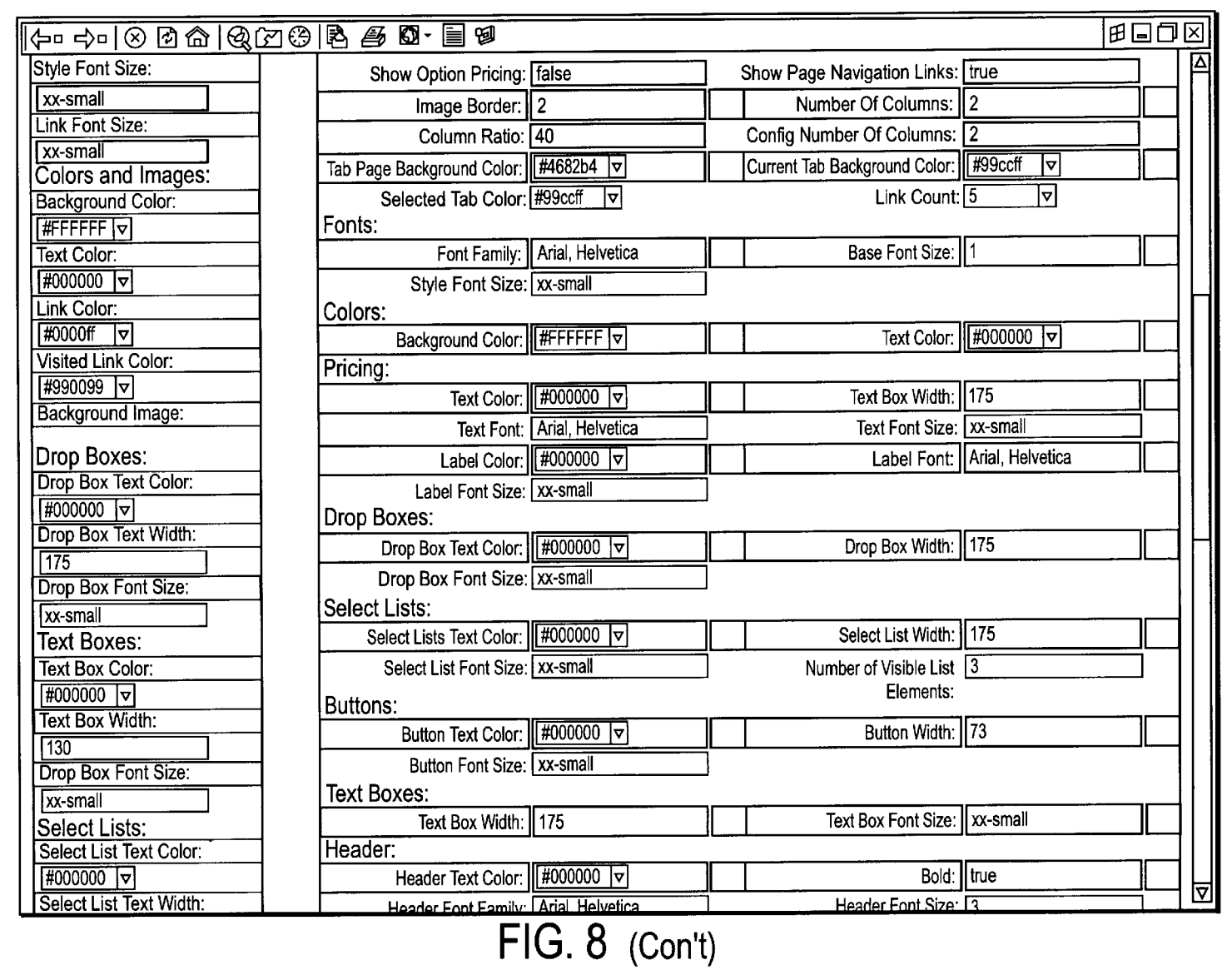
Figure 8:
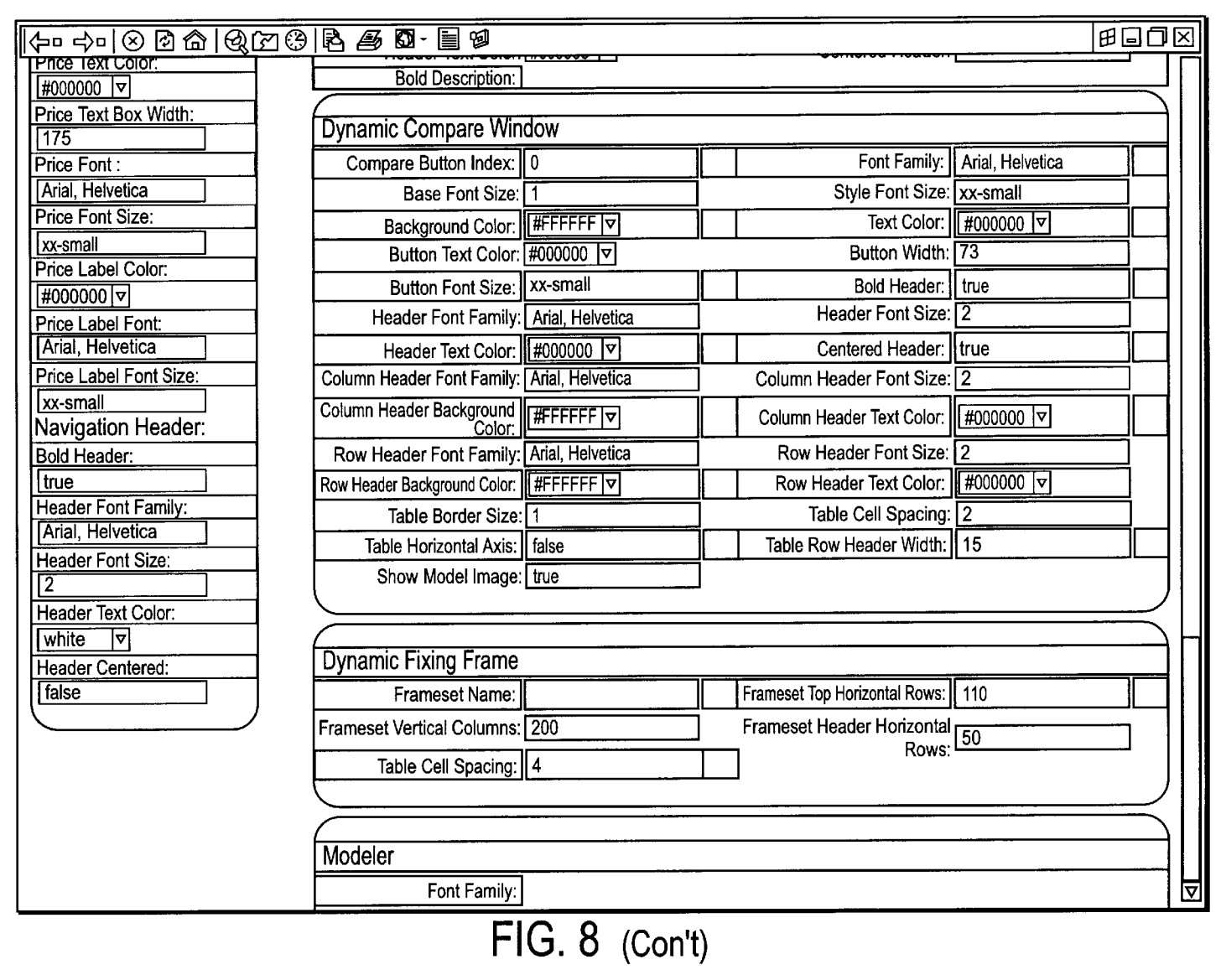

FIG. 8 illustrates an exemplary user input and modification window 800. User input and modification window 800 includes a number of global user input element fields, navigation frame fields, dynamic content frame fields, and the like. The fields are used to input elements into product and GUI data 302 for a particular domain. Fields are input that indicate the user interface elements types and optional domain tags which determine the run time behavior of each of the user interface elements. For example, the user may enter tags to indicate whether a single select list box or a multitude list box with the like is utilized for the display as well as the how the information is to be displayed. For example, whether or not the user interface pages are presented as sequential pages or as grouped elements, whether or not the domain is required for a final product selection and the like.

Figure 9:
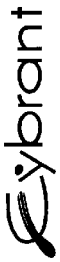
FIG. 9 illustrates an exemplary information block input window.

FIG. 9 illustrates an exemplary information block input window 900. Window 900 is displayed after a user selects a particular domain for viewing. The information used to draw or paint to the HTML page are shown in FIG. 9 are downloaded from server to client after a user accesses a particular domain. In the example of FIG. 9, the information is used to display a medicine or drugstore e-commerce application. After the user accesses a particular domain, the information is downloaded to the client from the server and the client applet downloaded from the server is used to create the display. Window 900 includes a number of fields for selecting specific information contained in the downloaded interactive decision map file.

Figure 10:
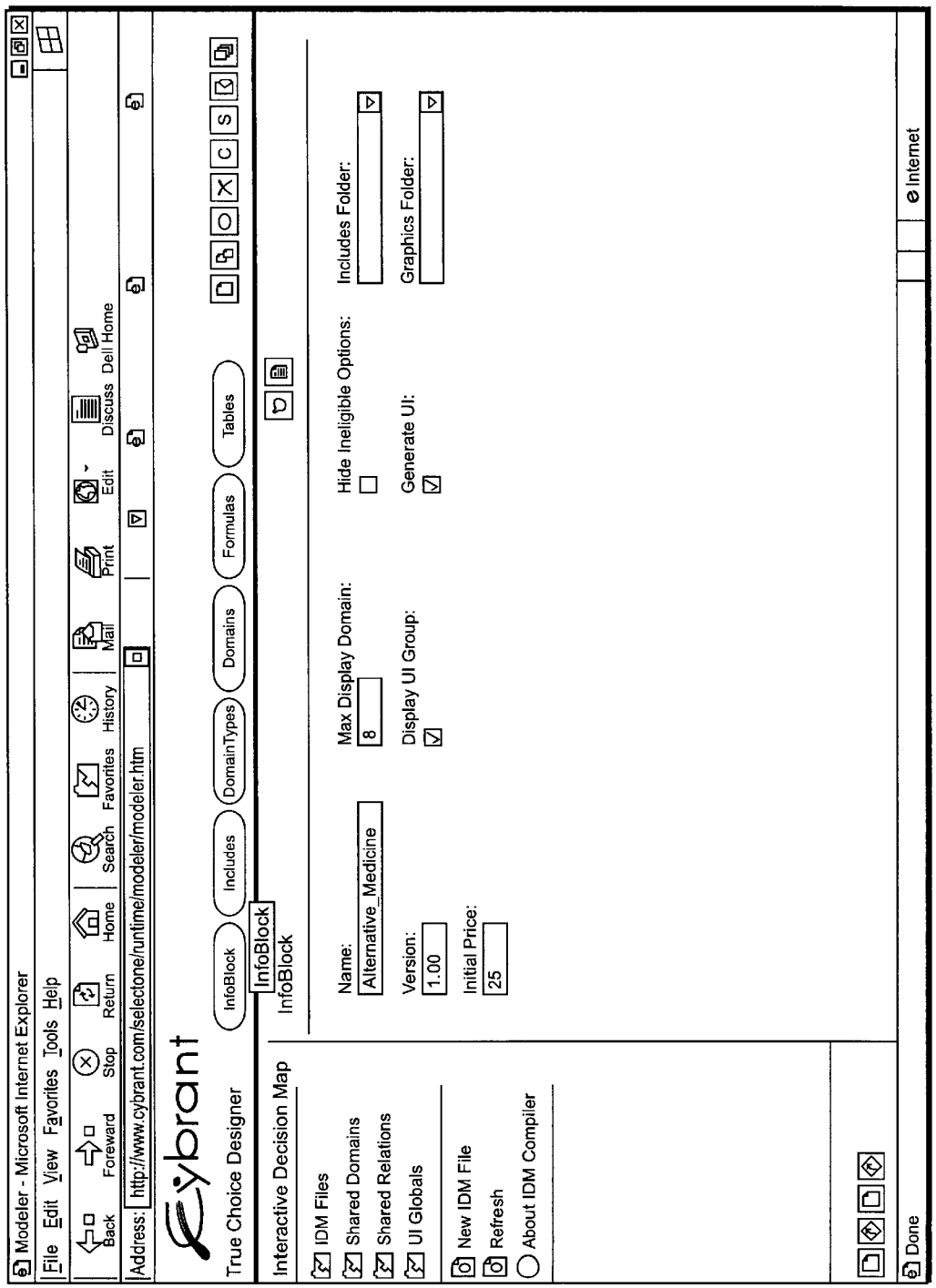
FIG. 10 illustrates an exemplary interactive decision map window.

FIG. 10 illustrates an exemplary interactive decision map window 1000. Decision map window 1000 is displayed after the user selects specific information from information block input window 800. Window 1000 includes a number of input and drop selection boxes and for choosing and selecting information downloaded from server 102.

Figure 11:
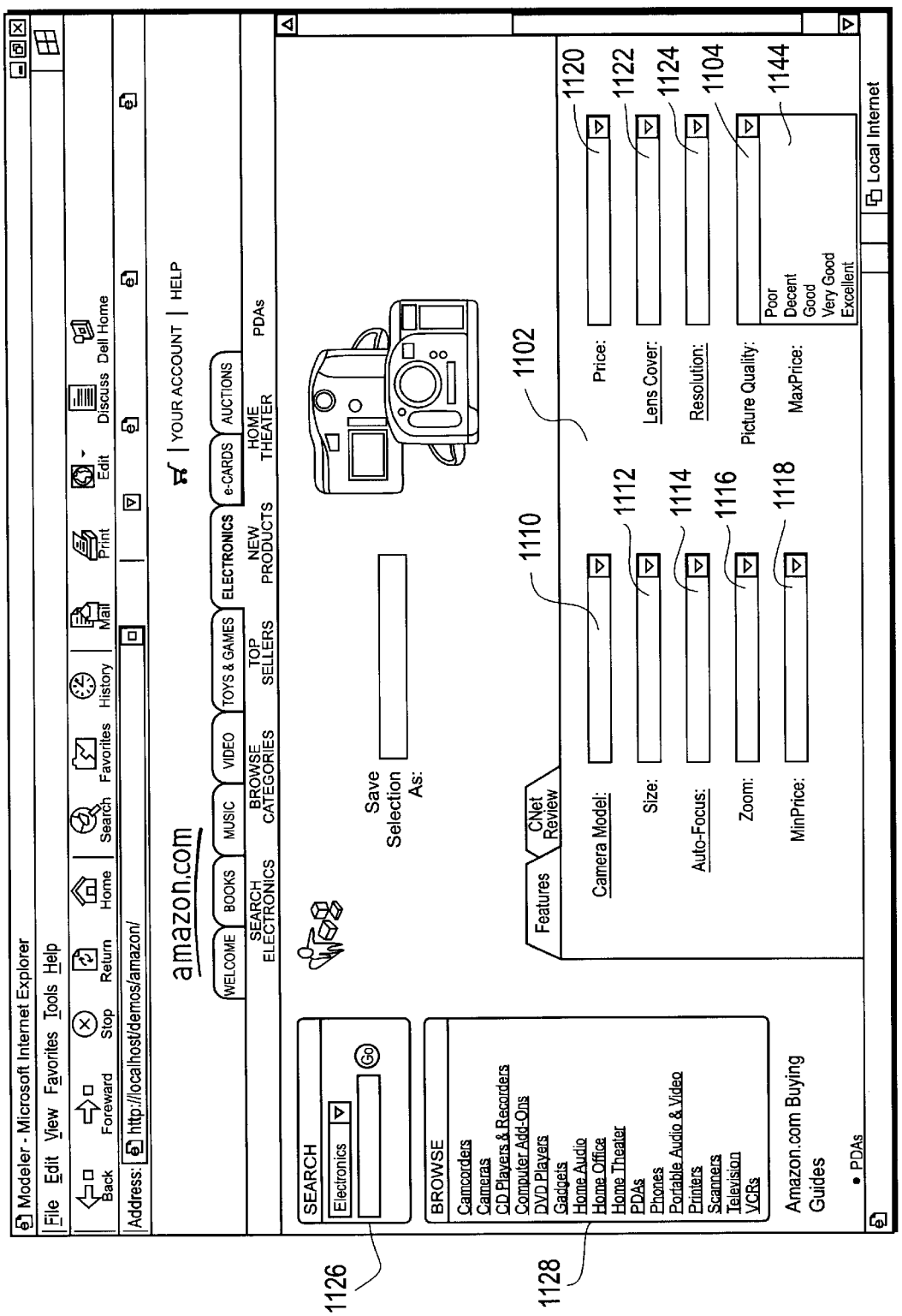
FIG. 11 illustrates an exemplary feature selection window.

FIG. 11 illustrates an exemplary feature selection window 1100. Window 1100 includes a feature selection pop up window 1102 containing a number of feature selection pull down boxes 1104–1124. In addition, window 1100 also includes a search box 1126 and a browse box 1128. After a domain file has been down loaded from the server to the client, the user may make selections of the various products from any of the pull down boxes (1104–1124). For example, the user may pull down picture quality box 1104 to give the selections shown at 1144. In this example, picture qualities may be selected based on poor, decent, good, very good, excellent or any combination deemed suitable.

Figure 12:
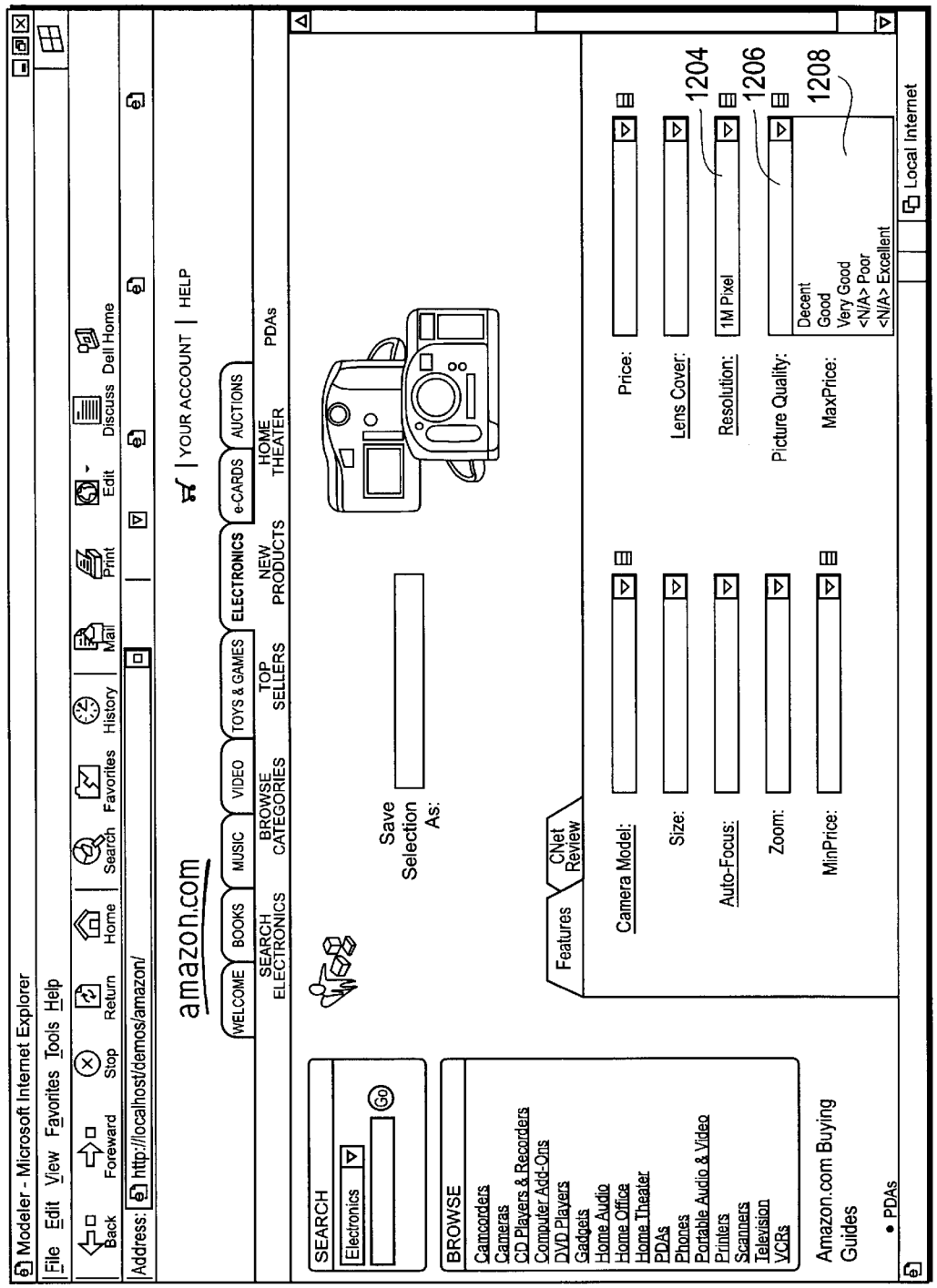
FIG. 12 illustrates an exemplary restricted options window.

FIG. 12 illustrates an exemplary restricted options window 1200. In the example of FIG. 12, the user has selected a resolution selection box 1204 for digital cameras of one million pixels or greater. After the user selects the resolution, the picture quality selection is limited to those pictures qualities deemed suitable a one million pixel. In the example, once the user pulls down picture quality selection box 1206, the options shown in 1208 indicate that only decent good and very good picture quality cameras may be selected. Any other selection would be an invalid selection and not selectable.

Figure 13:
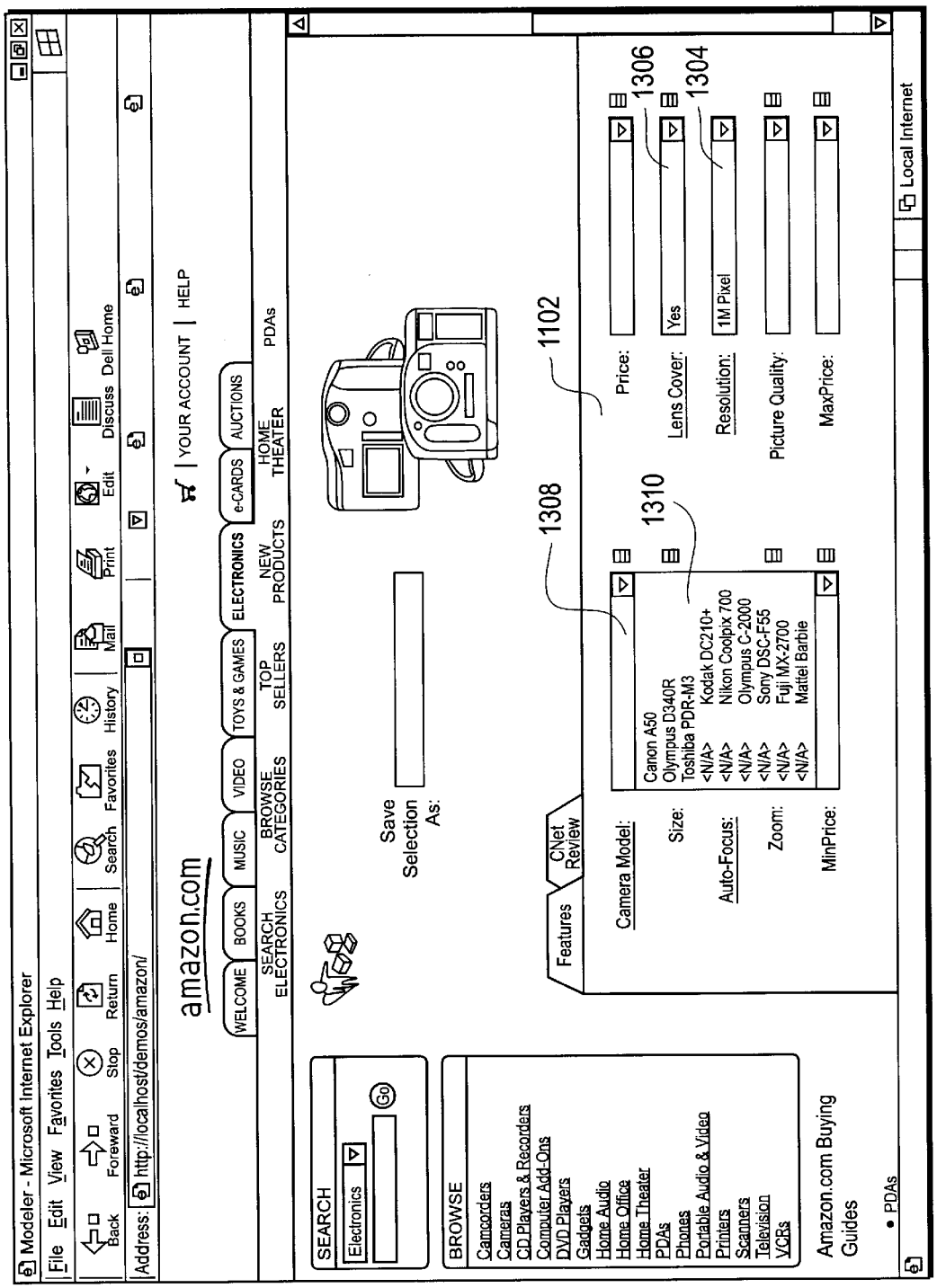
FIG. 13 illustrates another exemplary restricted options window.

FIG. 13 illustrates another exemplary restricted option window 1300. Within window 1300, the user has selected a resolution of one million pixel and resolution selection box 1304 and that the lens cover be provided as shown in the lens cover box selection 1304. For the digital camera selection, when the user pulls down camera models, only those camera models that meet the selected criteria will be indicated in box 1310. Other models that do not fit the criteria may be indicated with a "N/A" as shown. In an alternate embodiment, the camera models not available would not be shown in pull down box 1310.

Figure 14:
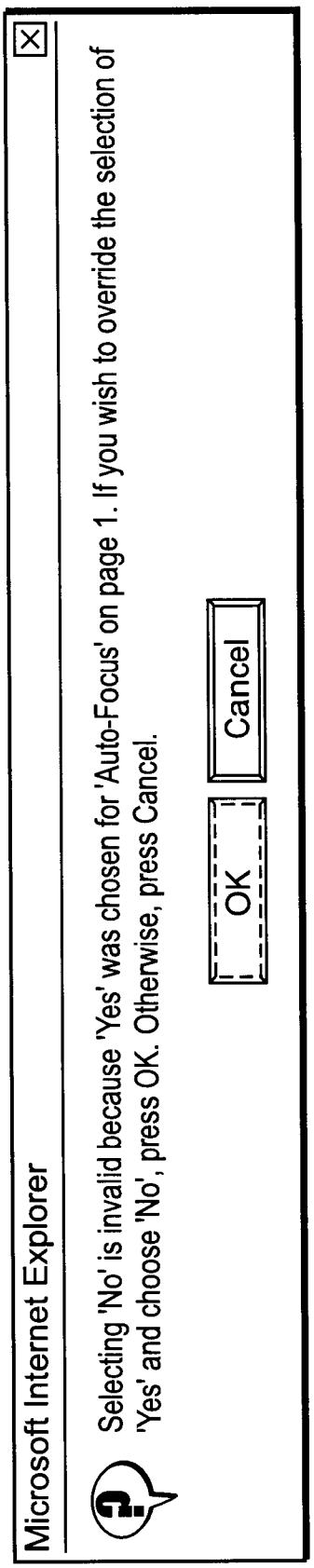
FIG. 14 illustrates an exemplary override message window.

FIG. 14 illustrates an exemplary override message window 1400. Window 1400 is shown whenever a user selects what might be considered an invalid selection or tries to override the selection criteria. For example, referring again to FIG. 13, if the user selects a camera model not applicable to the selections (for example a Kodak DC210 Plus), the pop up window 1400 would be shown. At this point, the user may override the selection criteria by pressing okay. If the user does not wish to override the selection criteria, than the user may cancel by pressing the cancel button.

FIG. 15 illustrates an exemplary product comparison window 1500. Window 1500 may be shown at any time the user is making selections within features box 1102. Referring to FIG. 13, if the user has made selections as shown, the user may at any time show the features of the cameras available for the selection criteria. The selection may be performed by clicking on a show features box or through a pull down menu. The product comparison window 1500 shows the details of the selected merchandise (cameras) side by side in order for the use to make a valid selection of cameras.

The specific arrangements and methods herein are merely illustrative of the principles of this invention. Numerous modifications in form and detail may be made by those skilled in the art without departing from the true spirit and scope of the invention.

What is claimed is:

1. A method of processing data comprising:
   reading at least one constraint-based configuration file;
   processing the at least one constraint-based configuration file into an interactive decision map file;
   creating an index of visual information for the decision map file;
   mapping the at least one constraint-based configuration file into a plurality of display pages; and
   updating a page of the plurality of display pages directly from the at least one constraint-based configuration file.

2. The method of claim 1 further comprising:
   updating at least one selection based upon at least one user input to provide visual feedback to enable a user to discern between valid and invalid selection options.

3. The method of claim 1 further comprising:
   displaying a page of the plurality of pages using a graphical user interface (GUI).

4. The method of claim 1 wherein the at least one constraint-based configuration file is received in a compressed format.

5. The method of claim 1 wherein mapping is performed on a compressed at least one constraint-based configuration file.

6. The method of claim 1 wherein the constraint-based configuration file is an array of truth tables.

7. The method of claim 1 wherein the constraint-based configuration file contains only valid data combinations.

8. The method of claim 1, wherein the mapping is performed by creating an index of information for the constraint-based configuration file.

9. The method of claim 1, wherein the mapping and updating are performed at a client.

10. The method of claim 1, further comprising updating at least one selection based upon at least one user input to provide visual feedback to enable a user to discern between valid and invalid selection options.

11. A method of processing data comprising:
    generating at least one constraint-based configuration file from at least one predefined data configuration domain at a server;
    mapping the at least one constraint-based configuration file into a plurality of display pages at a client;
    updating a page of the plurality of display pages directly from the at least one constraint-based configuration file; and
    updating at least one selection based upon at least one user input to provide visual feedback to enable a user to discern between valid and invalid selection options.

12. The method of claim 11 further comprising:
    displaying a page of the plurality of pages using a graphical user interface (GUI).

13. The method of claim 11 further comprising:
    defining at least one data configuration domain.

14. The method of claim 13 wherein defining further comprises:
    entering configuration domain relations; and
    defining GUI tags for the configuration domain relations.

15. The method of claim 13 wherein defining further comprises modeling the data configuration domain into an extended markup language (XML) configuration file.

16. The method of claim 11 wherein generating further comprises:
    combining user interface definition tags, the configuration domain and relation definitions; and
    compiling the combined data.

17. The method of claim 11 further comprising:
    compressing the at least one constraint-based configuration file.

18. The method of claim 11 wherein mapping is performed on a compressed at least one constraint-based configuration file.

19. The method of claim 11 wherein generating further comprises compiling product components into an interactive decision map.

20. The method of claim 19 wherein the interactive decision map is an array of truth tables.

21. The method of claim 11 wherein the constraint-based configuration file contains only valid data combinations.

22. The method of claim 11 wherein mapping further comprises:
    reading the at least one constraint-based configuration file;
    processing the at least one constraint-based configuration file into an interactive decision map file; and
    creating an index of visual information for the decision map file.

23. A system for processing data comprising:
    means for generating at least one constraint-based configuration file from at least one pre-defined data configuration domain at a server;
    means for mapping the at least one constraint-based configuration file into a plurality of display pages at a client;
    means for updating a page of the plurality of display pages directly from the at least one constraint-based configuration file; and
    means for updating at least one selection based upon at least one user input to provide visual feedback to enable a user to discern between valid and invalid selection options.

24. A system for processing data comprising:
    means for reading at least one constraint-based configuration file.
    means for processing the at least one constraint-based configuration file into an interactive decision map file;
    means for creating an index of visual information for the decision map file;
    means for mapping from the at least one constraint-based configuration file into a plurality of display pages; and
    means for updating a page of the plurality of display pages directly from the at least one constraint-based configuration file.

25. The system of claim 24, wherein the mapping is performed by creating an index of information for the constraint-based configuration file.

26. The system of claim 24, wherein the mapping and updating are performed at a client.

27. The system of claim 24, further comprising means for updating at least one selection based upon at least one user input to provide visual feedback to enable a user to discern between valid and invalid selection options.

28. An article of manufacture including one or more computer-readable media with executable instructions therein, which, when executed by a processing device causes the processing device to:
- generate at least one constraint-based configuration file from at least one predefined data configuration domain;
- map the at least one constraint-based configuration file into a plurality of display pages at a client;
- update a page of the plurality of display pages directly from the at least one constraint-based configuration file; and
- update at least one selection based upon at least one user input to provide visual feedback to enable a user to discern between valid and invalid selection options.

29. An article of manufacture including one or more computer-readable media with executable instructions therein, which, when executed by a processing device causes the processing device to:
- read at least one constraint-based configuration file;
- process the at least one constraint-based configuration file into an interactive decision map file;
- create an index of visual information for the decision map file;
- map the at least one constraint-based configuration file into a plurality of display pages; and
- update a page of the plurality of display pages directly from the at least one constraint-based configuration file.

30. The article of claim 29, wherein the mapping is performed by creating an index of information for the constraint-based configuration file.

31. The article of claim 29, wherein the mapping and updating are performed at a client.

32. The article of claim 29, further causes the processing device to update at least one selection based upon at least one user input to provide visual feedback to enable a user to discern between valid and invalid selection options.

33. A system for processing data comprising:
- a compiler to generate at least one constraint-based configuration file from the at least one data configuration domain;
- a browser to receive the at least one constraint-based configuration file at a client; and
- an applet to map the at least one constraint-based configuration file into a plurality of display pages at the client, to update a page of the plurality of display pages directly from the received at least one constraint-based configuration file, and to update at least one selection based upon at least one user input to provide visual feedback to enable a user to discern between valid and invalid selection options.

34. The system of claim 33, further comprising:
- a modeler to define the at least one data configuration domain.

35. The system of claim 34 wherein the modeler further compresses the at least one constraint-based configuration file.

36. The system of claim 34 wherein the modeler further:
- enters configuration domain relations; and
- defines GUI relations for the configuration domain relations.

37. The system of claim 34 wherein the modeler further models the data configuration domain into an extended markup language (XML) configuration file.

38. The system of claim 33 further comprising:
- an application programming interface (API) to display a page of the plurality of pages using a graphical user interface (GUI).

39. The system of claim 33 wherein the compiler further:
- combines user interface definition tags, the configuration domain, and relation definitions; and
- compiles the combined data.

40. The system of claim 33 wherein the applet maps the plurality of pages on a compressed at least one constraint-based configuration file.

41. The system of claim 33 wherein the compiler compiles product components into an interactive decision map.

42. The system of claim 41 wherein the interactive decision map is an array of truth tables.

43. The system of claim 33 wherein the constraint-based configuration file contains only valid data combinations.

44. The system of claim 33 wherein the applet further:
- reads the at least one constraint-based configuration file;
- processes the at least one constraint-based configuration file into an interactive decision map file; and
- creates an index of visual information for the decision map file.

* * * * *